United States Patent
Tanaka et al.

(10) Patent No.: US 9,459,544 B2
(45) Date of Patent: Oct. 4, 2016

(54) HYDROXYGALLIUM PHTHALOCYANINE CRYSTAL, ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Masato Tanaka, Tagata-gun (JP); Tsutomu Nishida, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/736,836

(22) Filed: Jun. 11, 2015

(65) Prior Publication Data
US 2015/0362850 A1  Dec. 17, 2015

(30) Foreign Application Priority Data
Jun. 13, 2014 (JP) ................. 2014-122712

(51) Int. Cl.
*G03G 5/06* (2006.01)
*C09B 47/04* (2006.01)

(52) U.S. Cl.
CPC ........... *G03G 5/0696* (2013.01); *C09B 47/045* (2013.01)

(58) Field of Classification Search
CPC .. G03G 5/0696; C09B 47/045; C09B 47/085
USPC ................................................. 430/78, 59.4
See application file for complete search history.

(56) References Cited

U.S. PATENT DOCUMENTS

| 5,302,479 | A | * | 4/1994 | Daimon | C09B 7/0016 430/56 |
| 5,463,041 | A | * | 10/1995 | Nukada | C09B 7/0016 540/139 |
| 5,495,011 | A | * | 2/1996 | Nukada | G03G 5/0696 540/139 |
| 5,885,737 | A | * | 3/1999 | Tanaka | C07F 5/003 399/111 |
| 5,932,722 | A | * | 8/1999 | Hirai | G03G 5/0696 430/78 |

(Continued)

FOREIGN PATENT DOCUMENTS

| JP | H05-263007 A | 10/1993 |
| JP | H06-93203 A | 4/1994 |

(Continued)

OTHER PUBLICATIONS

English language machine translation of JP 09-143386 (Jun. 1997).*

*Primary Examiner* — Christopher Rodee
(74) *Attorney, Agent, or Firm* — Canon U.S.A. Inc., IP Division

(57) ABSTRACT

The present invention provides a novel hydroxygallium phthalocyanine crystal and an electrophotographic photosensitive member capable of outputting an image with few failures due to a ghost phenomenon not only in normal-temperature, normal-humidity environments but also even in low-temperature, low-humidity environments. The hydroxygallium phthalocyanine crystal has peaks at Bragg angles $2\theta\pm0.2°$ of 7.5°, 9.9°, 25.2°, and 28.3° as determined by X-ray diffraction with Cu K$\alpha$ radiation. The intensity of the peak at a Bragg angle $2\theta\pm0.2°$ of 9.9° is higher than the intensity of the peak at a Bragg angle $2\theta\pm0.2°$ of 7.5°.

10 Claims, 10 Drawing Sheets

(56) References Cited

U.S. PATENT DOCUMENTS

| | | | |
|---|---|---|---|
| 8,530,124 B2* | 9/2013 | Sakaguchi | G03G 5/0677 399/159 |
| 2001/0018156 A1* | 8/2001 | Tanaka | C09B 47/067 430/56 |
| 2002/0001765 A1* | 1/2002 | Tanaka | C09B 7/0019 430/59.4 |
| 2003/0148201 A1* | 8/2003 | Kodera | G03G 5/0564 430/74 |
| 2005/0282076 A1* | 12/2005 | Tanaka | G03G 5/0517 430/60 |
| 2006/0286468 A1* | 12/2006 | Chambers | C09B 47/045 430/58.8 |
| 2006/0286469 A1* | 12/2006 | Wu | G03G 5/0696 430/58.8 |
| 2012/0003576 A1* | 1/2012 | Tanaka | G03G 5/0614 430/56 |
| 2013/0137032 A1* | 5/2013 | Tanaka | C09B 67/0026 430/127 |

FOREIGN PATENT DOCUMENTS

| | | | |
|---|---|---|---|
| JP | 09143386 A | * | 6/1997 |
| JP | H10-67946 A | | 3/1998 |
| JP | 2002235014 A | * | 8/2002 |
| JP | 2011-094101 A | | 5/2011 |

* cited by examiner

HYDROXYGALLIUM PHTHALOCYANINE CRYSTAL, ELECTROPHOTOGRAPHIC PHOTOSENSITIVE MEMBER, PROCESS CARTRIDGE, AND ELECTROPHOTOGRAPHIC APPARATUS

BACKGROUND OF THE INVENTION

1. Field of the Invention

The present invention relates to a hydroxygallium phthalocyanine crystal, an electrophotographic photosensitive member, a process cartridge, and an electrophotographic apparatus.

2. Description of the Related Art

At present, the oscillation wavelength of semiconductor lasers widely used as exposure devices for electrophotographic photosensitive members is long, 650 nm to 820 nm. Therefore, electrophotographic photosensitive members having high sensitivity to light with such a long wavelength are under development.

A phthalocyanine pigment is effective as a charge generation material with high sensitivity to light in such a long wavelength range and is used in a photosensitive layer of an electrophotographic photosensitive member. In particular, oxytitanium phthalocyanine and gallium phthalocyanine have excellent sensitivity properties. Various crystal forms thereof have been reported.

Particularly regarding hydroxygallium phthalocyanine, Japanese Patent Laid-Open Nos. 5-263007, 6-93203, and 10-67946 report various crystal forms. In particular, Japanese Patent Laid-Open No. 5-263007 describes that a hydroxygallium phthalocyanine crystal having strong diffraction peaks at Bragg angles 2θ±0.2° of 7.5°, 9.9°, 12.5°, 16.3°, 18.6°, 25.1°, and 28.3° as determined by X-ray diffraction with Cu Kα radiation has excellent sensitivity properties. Japanese Patent Laid-Open No. 10-67946 describes that a hydroxygallium phthalocyanine crystal having the strongest peak at a Bragg angle 2θ±0.2° of 28.1° as determined by X-ray diffraction with Cu Kα radiation has excellent sensitivity properties.

SUMMARY OF THE INVENTION

The present invention is directed to providing a novel hydroxygallium phthalocyanine crystal; an electrophotographic photosensitive member capable of outputting an image with few failures due to a ghost phenomenon not only in normal-temperature, normal-humidity environments but also even in low-temperature, low-humidity environments which are particularly severe conditions; a process cartridge including the electrophotographic photosensitive member; and an electrophotographic apparatus including the electrophotographic photosensitive member.

According to one aspect of the present invention, there is provided a hydroxygallium phthalocyanine crystal having peaks at Bragg angles 2θ±0.2° of 7.5°, 9.9°, 25.2°, and 28.3° as determined by X-ray diffraction with Cu Kα radiation. The intensity of the peak at a Bragg angle 2θ±0.2° of 9.9° is higher than the intensity of the peak at a Bragg angle 2θ±0.2° of 7.5°.

According to another aspect of the present invention, there is provided an electrophotographic photosensitive member including a support and a photosensitive layer on the support. The photosensitive layer contains the hydroxygallium phthalocyanine crystal.

According to further aspect of the present invention, there is provided a process cartridge, detachable from a main body of an electrophotographic apparatus. The process cartridge integrally supports: the electrophotographic photosensitive member; and at least one device selected from the group consisting of a charging device, a developing device, and a cleaning device.

Furthermore, according to further aspect of the present invention, there is provided an electrophotographic apparatus including the electrophotographic photosensitive member, a charging device, an exposure device, a developing device, and a transfer device.

According to the present invention, a hydroxygallium phthalocyanine crystal, serving as a charge generation material, having excellent properties can be provided. Furthermore, the following photosensitive member can be provided: an electrophotographic photosensitive member capable of outputting an image with few failures due to a ghost phenomenon not only in normal-temperature, normal-humidity environments but also even in low-temperature, low-humidity environments which are particularly severe conditions. In addition, a process cartridge including the electrophotographic photosensitive member and an electrophotographic apparatus including the electrophotographic photosensitive member can be provided.

Further features of the present invention will become apparent from the following description of exemplary embodiments with reference to the attached drawings.

DESCRIPTION OF THE EMBODIMENTS

Various crystal forms of hydroxygallium phthalocyanine serving as a charge generation material are under investigation.

For the further enhancement of image quality in recent years, the improvement of image failures due to a ghost phenomenon in various environments is required. As a result of various investigations performed by the inventors, it has become clear that electrophotographic photosensitive members including hydroxygallium phthalocyanine crystals described in Japanese Patent Laid-Open Nos. 5-263007, 6-93203, and 10-67946 have room for improvement in the ghost phenomenon.

Therefore, the inventors have performed intensive investigations to obtain an electrophotographic photosensitive member capable of outputting an image with few failures due to the ghost phenomenon not only in normal-temperature, normal-humidity environments but also even in low-temperature, low-humidity environments which are particularly severe conditions. As a result, the inventors have found that an image with few failures due to the ghost phenomenon can be output in normal-temperature, normal-humidity environments and low-temperature, low-humidity environments by the use of a hydroxygallium phthalocyanine crystal having a peak at a specific Bragg angle and specific peak intensity as determined by X-ray diffraction with Cu Kα radiation as a charge generation material.

Figure 2:
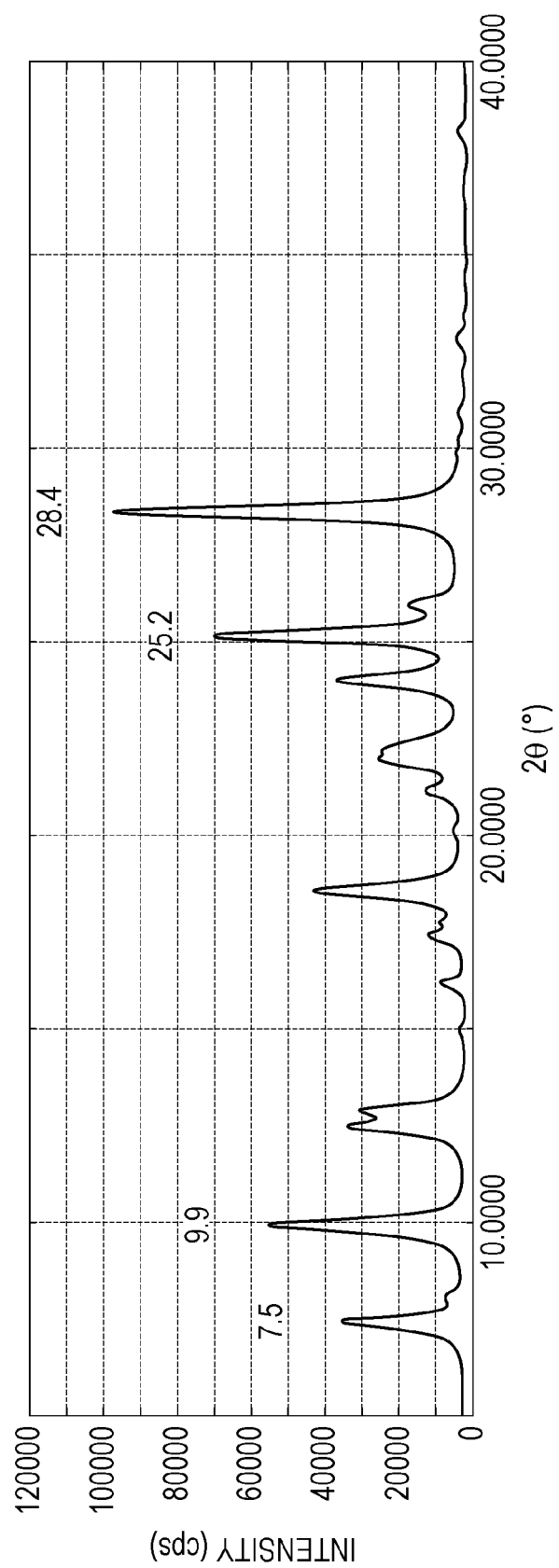
FIG. 2 is a powder X-ray diffraction pattern of a hydroxygallium phthalocyanine crystal obtained in Example 1-1.

As shown in FIG. 2, a hydroxygallium phthalocyanine crystal according to an embodiment of the present invention has peaks at Bragg angles 2θ±0.2° of 7.5°, 9.9°, 25.2°, and 28.3° as determined by X-ray diffraction with Cu Kα radiation. The intensity of the peak at a Bragg angle 2θ±0.2° of 9.9° is higher than the intensity of the peak at a Bragg angle 2θ±0.2° of 7.5°.

Hydroxygallium phthalocyanine is a compound represented by the following formula:

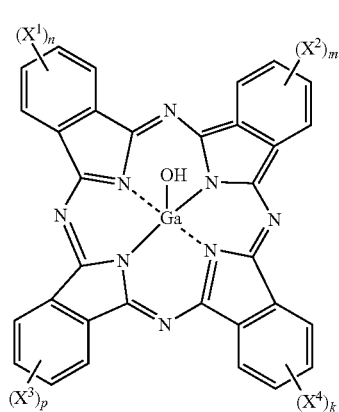

(A)

where n, m, p, and k are independently an integer of 0 to 4; $X^1$, $X^2$, $X^3$, and $X^4$ represent a chlorine atom when n, m, p, and k are an integer of 1 to 4; and $X^1$, $X^2$, $X^3$, and $X^4$ represent a hydrogen atom when n, m, p, and k are 0, respectively.

In Formula (A), n, m, p, and k are preferably 0 or 1 and the sum of n, m, p, and k is particularly preferably 0 or 1.

As described in Japanese Patent Laid-Open No. 5-263007, in the X-ray diffraction of a conventional hydroxygallium phthalocyanine crystal with Cu Kα radiation, the intensity of a peak at a Bragg angle 2θ±0.2° of 9.9° is lower than the intensity of a peak at a Bragg angle 2θ±0.2° of 7.5°. In particular, the intensity of the peak at a Bragg angle 2θ±0.2° of 9.9° is about half the intensity of the peak at a Bragg angle 2θ±0.2° of 7.5°.

On the other hand, the hydroxygallium phthalocyanine crystal is a novel crystal in that the intensity of the peak at a Bragg angle 2θ±0.2° of 9.9° is higher than the intensity of the peak at a Bragg angle 2θ±0.2° of 7.5° as determined by X-ray diffraction with Cu Kα radiation. As a result of investigations performed by the inventors, it has become clear that when the hydroxygallium phthalocyanine crystal is contained in a photosensitive layer in the form of a charge generation material, the ghost phenomenon is suppressed even in low-temperature, low-humidity environments.

From the viewpoint of suppressing a ghost, in the hydroxygallium phthalocyanine crystal, the intensity of the peak at a Bragg angle 2θ±0.2° of 9.9° preferably ranges from 1.1 to 2.0 when the intensity of the peak at a Bragg angle 2θ±0.2° of 7.5° is 1.

The hydroxygallium phthalocyanine crystal is preferably a hydroxygallium phthalocyanine crystal in which an amide compound is contained. The content of the amide compound in the hydroxygallium phthalocyanine crystal is preferably 0.1% by mass ore more and 3% by mass or less based on a hydroxygallium phthalocyanine in the hydroxygallium phthalocyanine crystal.

Examples of the amide compound include N,N-dimethylformamide, N,N-dimethylacetamide, N-methylformamide, N-methylacetamide, N-propylformamide, and N-methylpropionamide. N-methylformamide is preferred.

The term "hydroxygallium phthalocyanine crystal in which an amide compound is contained" means that an amide compound is incorporated in a crystal.

A method of producing a hydroxygallium phthalocyanine crystal containing the amide compound is described below.

The hydroxygallium phthalocyanine crystal containing the amide compound is obtained in a step of crystallographically transforming hydroxygallium phthalocyanine by milling the amide compound, an additive, and hydroxygallium phthalocyanine together. The hydroxygallium phthalocyanine crystal may be a hydroxygallium phthalocyanine crystal in which a phenolic compound, an amine compound, or a carbonyl compound is contained. The additive is a phenolic compound, an amine compound, or a carbonyl compound. A solvent may be used during milling in addition to the amide compound and the additive as required.

Hydroxygallium phthalocyanine used for milling is preferably one obtained by an acid pasting process.

Milling (wet milling) is treatment performed using, for example, a dispersant including glass beads, steel beads, or alumina balls and a milling machine such as a sand mill or a ball mill. The milling time is preferably about 100 hours to 2,000 hours. A particularly preferable way is to check the Bragg angle of a crystal by sampling every 10 hours to 50 hours. The amount of the dispersant used for milling is preferably 10 times to 50 times the amount of hydroxygallium phthalocyanine on a mass basis.

Examples of the phenolic compound include azotized calixarene compounds, azotized calixresorcinarene compounds, calixarene compounds, and calixresorcinarene compounds. The amount of the phenolic compound used is preferably 0.01 times to 2 times the amount of hydroxygallium phthalocyanine on a mass basis.

Examples of the amine compound include morpholine compounds, piperidine compounds, 4-piperidone compounds, and imidazole compounds. The amount of the amine compound used is preferably 0.1 times to 2 times the amount of hydroxygallium phthalocyanine on a mass basis.

Examples of the carbonyl compound include benzophenone compounds, acetophenone compounds, anthraquinone compounds, and urea compounds. The amount of the carbonyl compound used is preferably 0.1 times to 2 times the amount of hydroxygallium phthalocyanine on a mass basis.

The above compounds can be used as the amide compound. In particular, the hydroxygallium phthalocyanine crystal preferably contains N-methylformamide. The amount of the amide compound used is preferably 10 times to 30 times the amount of hydroxygallium phthalocyanine on a mass basis.

Examples of the solvent include halogen solvents such as chloroform, ether solvents such as tetrahydrofuran, and sulfoxide solvents such as dimethyl sulfoxide. The amount of the solvent used is preferably 5 times to 20 times the amount of hydroxygallium phthalocyanine on a mass basis.

The fact that the hydroxygallium phthalocyanine crystal contains the amide compound and the content of the amide compound are determined in such a manner that the hydroxygallium phthalocyanine crystal is measured by nuclear magnetic resonance (NMR) and the obtained data is analyzed.

The hydroxygallium phthalocyanine crystal is measured by X-ray diffraction and NMR under conditions below.
Powder X-ray diffraction measurement
  Measurement system used: X-ray diffractometer, RINT-TTRII, available from Rigaku Corporation
  X-ray tube: Cu
  Tube voltage: 50 kV
  Tube current: 300 mA
  Scan mode: 2θ/θ scan
  Scan rate: 4.0°/min
  Sampling interval: 0.02°
  Start angle (2θ): 5.0°
  Stop angle (2θ): 40.0°
  Attachment: Reference sample holder
  Filter: Not used
  Incident monochromator: Used
  Counter monochromator: Not used
  Divergence slit: Open
  Divergence vertical limitation slit: 10.00 mm
  Scattering slit: Open
  Receiving slit: Open
  Flat monochromator: Used
  Counter: Scintillation counter NMR measurement
  Measurement system used: AVANCE III 500, available from BRUKER Inc.
  Solvent: Deuterium sulfate ($D_2SO_4$)
  Number of scans: 2,000

The hydroxygallium phthalocyanine crystal has excellent function as a photoconductor and is applicable to solar cells, sensors, switching elements, and the like in addition to electrophotographic photosensitive members.

The case of using the hydroxygallium phthalocyanine crystal as a charge generation material in an electrophotographic photosensitive member is described below.

An electrophotographic photosensitive member according to an embodiment of the present invention includes a support and a photosensitive layer on the support. Examples of the photosensitive layer includes a monolayer-type photosensitive layer containing a charge generation material and a charge transport material and a multilayer-type photosensitive layer in which a charge generation layer containing a charge generation material and a charge transport layer containing a charge transport material are separated from each other. In particular, a multilayer-type photosensitive layer including a charge generation layer and a charge transport layer on the charge generation layer is preferred.

Support

The support is preferably conductive one (conductive support). The support is made of, for example, metal such as aluminium, copper, zinc, vanadium, molybdenum, chromium, titanium, nickel, indium, gold, or platinum or an alloy such as an aluminium alloy or stainless steel. The support may be a resin support including a layer coated with aluminium, an aluminium alloy, indium oxide, tin oxide, or an indium oxide-tin oxide alloy by a vacuum vapor deposition process. The support may be one prepared by coating plastic, metal, or an alloy with conductive particles and a binder resin. The support may be one prepared by impregnating plastic or paper with conductive particles or one made of plastic containing a conductive polymer. The support may be surface-treated by cutting, roughening, anodizing, composite electrolytic polishing, wet honing, dry honing, or the like for the purpose of reducing interference fringes due to the scattering of a laser beam.

A conductive layer may be placed between the support and an undercoat layer below for the purpose of reducing interference fringes due to the scattering of a laser beam or for the purpose of masking (covering) flaws of the support. The conductive layer can be formed in such a manner that a wet coating is formed by applying a conductive layer coating fluid obtained by dispersing conductive particles such as carbon black particles, metal particles, or metal oxide particles and a binder resin in a solvent and is then dried.

Examples of the conductive particles include aluminium particles, titanium oxide particles, tin oxide particles, zinc oxide particles, carbon black particles, and silver particles. Examples of the binder resin include polyester, polycarbonate, polyvinyl butyral, acrylic resins, silicone resins, epoxy resins, melamine resins, urethane resins, phenol resins, and alkyd resins. Examples of the solvent in the conductive layer coating fluid include ether solvents, alcoholic solvents, ketone solvents, and aromatic hydrocarbon solvents.

The undercoat layer (also referred to as a barrier layer or an intermediate layer) may be placed between the support and the photosensitive layer. The undercoat layer has a barrier function and an adhesive function. The undercoat layer can be formed in such a manner that a wet coating of an undercoat layer coating fluid obtained by mixing a binder resin and a solvent is formed and is then dried.

Examples of the binder resin include polyvinyl alcohol; polyethylene oxide; ethylcellulose; methylcellulose; casein; polyamides such as nylon 6, nylon 66, nylon 610, copolymer nylons, and N-alkoxymethylated nylons; and polyurethane. The undercoat layer preferably has a thickness of 0.1 μm to 10 μm and more preferably 0.5 μm to 5 μm. Examples of the solvent in the undercoat layer coating fluid include ether solvents, alcoholic solvents, ketone solvents, and aromatic hydrocarbon solvents.

Photosensitive Layer

In the case of forming the monolayer-type photosensitive layer, a photosensitive layer coating fluid is prepared by mixing the hydroxygallium phthalocyanine crystal, which is used as a charge generation material, the charge transport material, a binder resin, and a solvent together. The monolayer-type photosensitive layer can be formed in such a manner that a wet coating of the photosensitive layer coating fluid is and is then dried.

In the case of forming the multilayer-type photosensitive layer, a charge generation layer coating fluid is prepared by mixing the hydroxygallium phthalocyanine crystal, which is used as a charge generation material, a binder resin, and a solvent together. The charge generation layer can be formed in such a manner that a wet coating of the charge generation layer coating fluid is and is then dried. Alternatively, the charge generation layer can be formed by vapor deposition.

Examples of the binder resin used to form the monolayer-type photosensitive layer or the charge generation layer include polycarbonate, polyester, butyral resins, polyvinyl acetal, acrylic resins, vinyl acetate resins, and urea resins. In particular, a butyral resin is preferred. These resins may be used alone or in combination.

The solvent used in the photosensitive layer coating fluid or the charge generation layer coating fluid include sulfoxide solvents, ketone solvents, ether solvents, ester solvents, and aromatic hydrocarbon solvents.

When the photosensitive layer is of a monolayer type, the photosensitive layer preferably has a thickness of 5 µm to 40 µm and more preferably 10 µm to 30 µm.

When the photosensitive layer is of a monolayer type, the content of the charge generation material in the photosensitive layer is preferably 3% to 30% by mass. The content of the charge transport material in the photosensitive layer is preferably 30% to 70% by mass. The monolayer-type photosensitive layer preferably has a thickness of 4 µm to 40 µm and more preferably 5 µm to 25 µm.

When the photosensitive layer is of a multilayer type, the content of the charge generation material in the charge generation layer is preferably 20% to 90% by mass and more preferably 50% to 80% by mass.

The charge generation layer preferably has a thickness of 0.01 µm to 10 µm and more preferably 0.1 µm to 3 µm.

Charge Transport Layer

The charge transport layer can be formed in such a manner that a wet coating is formed by applying a charge transport layer coating fluid obtained by dissolving the charge transport material and a binder resin in a solvent and is then dried.

Examples of the charge transport material include triarylamine compounds, hydrazone compounds, stilbene compounds, pyrazoline compounds, oxazole compounds, thiazole compounds, and triarylmethane compounds.

Examples of the binder resin used to form the charge transport layer include resins such as polyester, acrylic resins, polyvinylcarbazole, phenoxy resins, polycarbonate, polyvinyl butyral, polystyrene, polyvinyl acetate, polysulfone, polyarylate, polyvinylidene chloride, acrylonitrile copolymers, and polyvinylbenzal.

The content of the charge transport material in the charge transport layer is preferably 20% to 80% by mass and more preferably 30% to 70% by mass. The charge transport layer preferably has a thickness of 5 µm to 40 µm and more preferably 10 µm to 30 µm.

The following processes can be used as a process of coating the photosensitive layer: a dipping process, a spray coating process, a spinner coating process, a bead coating process, a blade coating process, and a beam coating process.

The hydroxygallium phthalocyanine crystal is used as the charge generation material and may be used in combination with another charge generation material. In this case, the content of the hydroxygallium phthalocyanine crystal is preferably 50% by mass or more with respect to all the charge generation materials.

A protective layer may be placed on the photosensitive layer as required. The protective layer can be formed in such a manner that a wet coating of a protective layer coating fluid obtained by dissolving resin in a solvent is formed and is then dried. Examples of the resin used to form the protective layer include polyvinyl butyral, polyester, polycarbonate including polycarbonate Z and modified polycarbonate, nylon, polyimide, polyarylate, polyurethane, styrene-butadiene copolymers, styrene-acrylic acid copolymers, and styrene-acrylonitrile copolymers.

In order to allow the protective layer to have a charge transport ability, the protective layer may be formed in such a manner that a monomer having a charge transport ability (hole transport ability) is polymerized by various reactions, followed by curing by a cross-linking reaction. In particular, the protective layer is preferably formed in such a manner that a charge transport compound (hole transport compound) containing a chain-polymerizable functional group is polymerized or is cross-linked so as to be cured.

The protective layer preferably has a thickness of 0.05 µm to 20 µm. The protective layer may contain conductive particles, an ultraviolet absorber, and the like. Examples of the conductive particles include metal oxide particles such as tin oxide particles.

Figure 1:
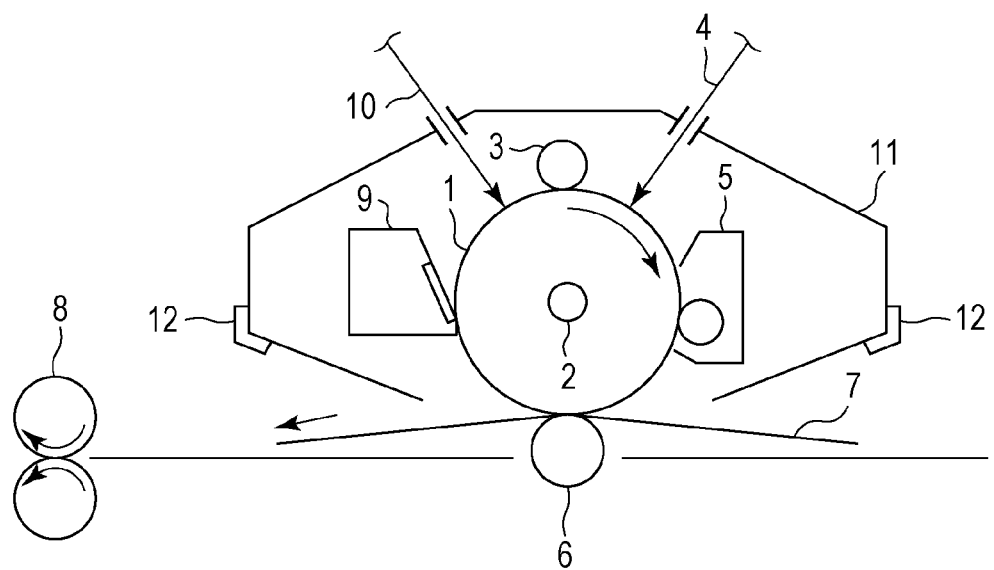
FIG. 1 is a schematic view of an electrophotographic apparatus including a process cartridge including an electrophotographic photosensitive member.

FIG. 1 is a schematic view of an exemplary electrophotographic apparatus including a process cartridge including the electrophotographic photosensitive member.

Reference numeral 1 represents the electrophotographic photosensitive member. The electrophotographic photosensitive member 1 is cylindrical (drum-shaped) and is rotated about an axis 2 at a predetermined peripheral speed (process speed) in the direction of an arrow. The surface of the electrophotographic photosensitive member 1 is positively or negatively charged with a charging device 3 during rotation. The charged surface of the electrophotographic photosensitive member 1 is irradiated with image exposure light 4 from an image exposure device (not shown), whereby an electrostatic latent image corresponding to target image information is formed. The image exposure light 4 is, for example, light that is output from the image exposure device, such as a slit exposure device or a laser beam scanning exposure device, and that is intensity-modulated depending on a time-sequence electric digital pixel signal for target image information.

The electrostatic latent image formed on the surface of the electrophotographic photosensitive member 1 is developed (normally or reversely developed) with a developer (toner) stored in a developing device 5, whereby a toner image is formed on the surface of the electrophotographic photosensitive member 1. The toner image formed on the surface of the electrophotographic photosensitive member 1 is transferred to a transfer material 7 with a transfer device 6. In this operation, a bias voltage opposite in polarity to the charge of toner is applied to the transfer device 6 from a bias power supply (not shown). The transfer material 7 is taken from a transfer material feeder (not shown) in synchronization with the rotation of the electrophotographic photosensitive member 1 and is supplied between the electrophotographic photosensitive member 1 and the transfer device 6.

The transfer material 7 having the transferred toner image is separated from the electrophotographic photosensitive member 1 and is conveyed to a fixing device 8. The toner image is fixed and is then printed out of the electrophotographic apparatus in the form of an image-formed product (print or copy).

After the toner image is transferred to the transfer material 7, the surface of the electrophotographic photosensitive member 1 is cleaned with a cleaning device 9 such that deposits including toner (transfer waste toner) is removed. In recent years, a cleanerless system has been developed, which enables transfer waste toner to be directly removed with a developing device. The surface of the electrophotographic photosensitive member 1 is discharged with pre-exposure light 10 emitted from a pre-exposure device (not shown) and is then repeatedly used for image formation. Incidentally, when the charging device 3 is a contact charging device including a charging roller or the like, the pre-exposure device is not necessarily needed.

In the present invention, the process cartridge can be prepared in such a manner that some of components such as the electrophotographic photosensitive member 1, the charging device 3, the developing device 5, and the cleaning device 9 are provided in a vessel and are integrated into one. The process cartridge can be configured to be detachable from a body of the electrophotographic apparatus. For example, the electrophotographic photosensitive member 1 and at least one of the charging device 3, the developing device 5, and the cleaning device 9 are integrated into a cartridge. The process cartridge 11 can be detached from the electrophotographic apparatus body using guides 12 such as rails.

When the electrophotographic apparatus is a copier or a printer, the image exposure light 4 may be reflected or transmitted light from a document. Alternatively, the image exposure light 4 may be light emitted by scanning a laser beam in accordance with a signal obtained by reading a document with a sensor or by driving an LED array or a liquid-crystal shutter array.

The electrophotographic photosensitive member 1 can be widely used in the field of electrophotographic applications such as laser beam printers, CRT printers, LED printers, fax machines, liquid-crystal printers, and laser plate making.

EXAMPLES

The present invention further described below in detail with reference to examples. The present invention is not limited to the examples. The term "parts" used below refers to "parts by mass". Incidentally, the thickness of a layer of an electrophotographic photosensitive member described in each of the examples and comparative examples was determined with an eddy-current thickness meter, Fischerscope, available from Fischer Instruments K.K. or was determined from the mass per unit area by density conversion.

Example 1-1

Hydroxygallium phthalocyanine was produced by substantially the same method as that described in Synthesis Example 1 and Example 1-1 of Japanese Patent Laid-Open No. 2011-94101.

In a nitrogen flow atmosphere, 5.46 parts of phthalonitrile and 45 parts of α-chloronaphthalene were charged into a reaction vessel, followed by heating to 30° C. and maintaining this temperature. Next, 3.75 parts of gallium trichloride was charged into the reaction vessel at this temperature (30° C.). The content of moisture in a mixed liquid was 150 ppm during charge. Thereafter, the temperature thereof was increased to 200° C. Next, in a nitrogen flow atmosphere, reaction was carried out at 200° C. for 4.5 hours, followed by cooling. After the temperature of a reaction mixture reached 150° C., the reaction mixture was filtered. The obtained filter cake was dispersed in N,N-dimethylformamide at 140° C. for 2 hours so as to be cleaned, followed by filtration. The obtained filter cake was rinsed with methanol and was then dried, whereby 4.65 parts of a chlorogallium phthalocyanine pigment was obtained (a yield of 71%). Next, 4.65 parts of the obtained chlorogallium phthalocyanine pigment was dissolved in 139.5 parts of concentrated sulfuric acid at 10° C. The solution was added dropwise to 620 parts of iced water under stirring such that re-precipitation occurred, followed by filtration using a filter press. The obtained wet cake (filter cake) was dispersed in 2% ammonia water so as to be cleaned, followed by filtration using a filter press. Next, the obtained wet cake (filter cake) was dispersed in ion-exchanged water so as to be cleaned, followed by filtration using a filter press three times, whereby hydroxygallium phthalocyanine (hydrous hydroxygallium phthalocyanine) with a solid content of 23% was obtained. A microwave was applied to 6.6 kg of the obtained hydroxygallium phthalocyanine (hydrous hydroxygallium phthalocyanine) using a hyper dryer, HD-06R™, available from Biocon (Japan) Ltd., the dryer having a frequency (oscillation frequency) of 2,455 MHz±15 MHz, whereby the hydroxygallium phthalocyanine was dried.

In a ball mill, 0.5 parts of the hydroxygallium phthalocyanine, 0.001 parts of a phenolic compound represented by Formula (1) below, and 10 parts of N-methylformamide were milled at room temperature (23° C.) for 470 hours using 20 parts of glass beads with a diameter of 0.8 mm. In this operation, a vessel used was a standardized bottle, PS-6™, available from Hakuyo Glass Co., Ltd. and was rotated at 120 revolutions per minute. A hydroxygallium phthalocyanine crystal was taken out of the dispersion using N-methylformamide, followed by filtration. A filter was washed with N-methylformamide and was then sufficiently washed with tetrahydrofuran. A filter cake was vacuum-dried, whereby 0.33 parts of the hydroxygallium phthalocyanine crystal was obtained. The obtained hydroxygallium phthalocyanine crystal had a powder X-ray diffraction pattern shown in FIG. 2. The hydroxygallium phthalocyanine crystal had peaks at Bragg angles 2θ±0.2° of 7.5°, 9.9°, 25.2°, and 28.3° as determined by X-ray diffraction with Cu Kα radiation. The intensity of the peak at a Bragg angle 2θ±0.2° of 9.9° was 1.54 when the intensity of the peak at a Bragg angle 2θ±0.2° of 7.5° was 1 as determined by X-ray diffraction with Cu Kα radiation.

It was confirmed by NMR measurement that the hydroxygallium phthalocyanine crystal obtained in Example 1-1 contained 0.60% by mass of N-methylformamide as converted from the proton ratio. Since N-methylformamide is soluble in tetrahydrofuran, it is understandable that N-methylformamide is contained in the hydroxygallium phthalocyanine crystal.

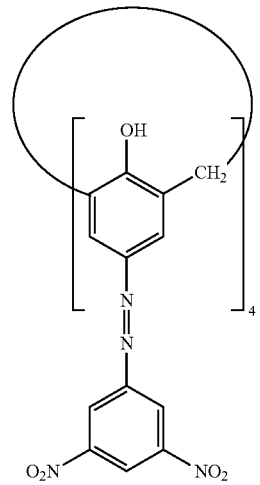

(1)

Figure 3:
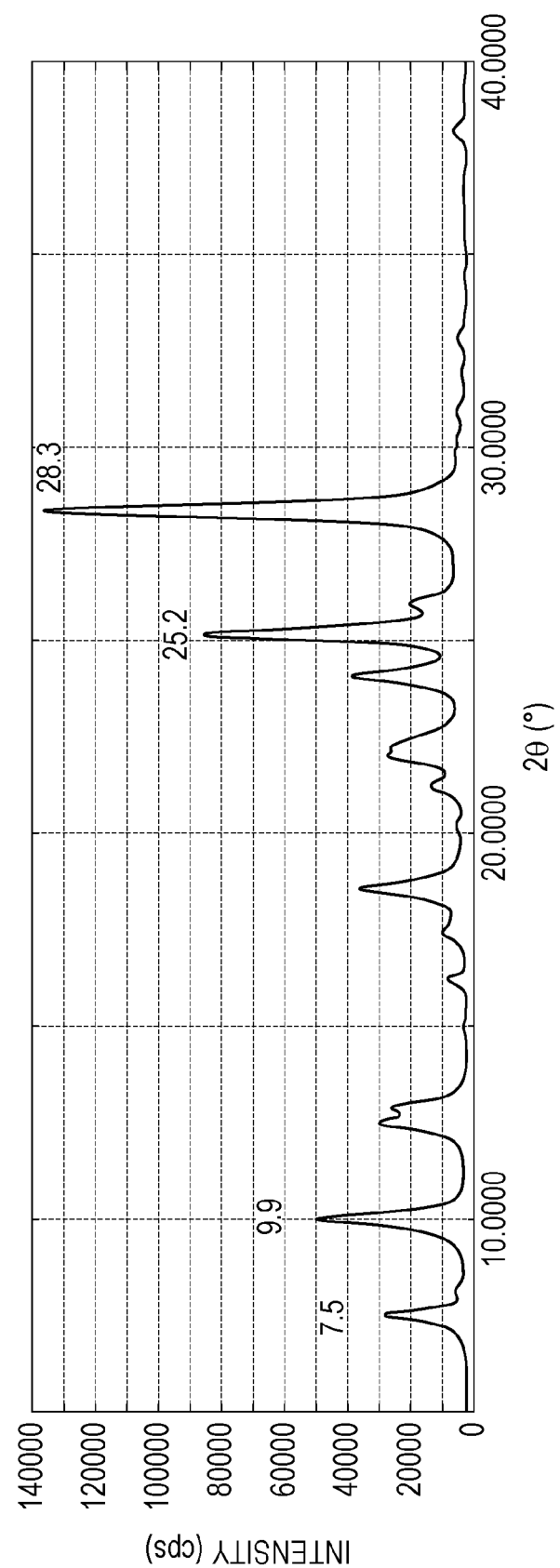
FIG. 3 is a powder X-ray diffraction pattern of a hydroxygallium phthalocyanine crystal obtained in Example 1-2.

In substantially the same manner as that described in Example 1-1 except that the milling time was varied from 470 hours to 1,000 hours, 0.45 parts of a hydroxygallium phthalocyanine crystal was obtained. The obtained hydroxygallium phthalocyanine crystal had a powder X-ray diffraction pattern shown in FIG. 3. The hydroxygallium phthalocyanine crystal had peaks at Bragg angles 2θ±0.2° of 7.5°, 9.9°, 25.2°, and 28.3° as determined by X-ray diffraction with Cu Kα radiation. The intensity of the peak at a Bragg angle 2θ±0.2° of 9.9° was 1.68 when the intensity of the peak at a Bragg angle 2θ±0.2° of 7.5° was 1 as determined by X-ray diffraction with Cu Kα radiation.

It was confirmed by NMR measurement that the hydroxygallium phthalocyanine crystal obtained in Example 1-2 contained 0.84% by mass of N-methylformamide as converted from the proton ratio.

Example 1-3

Figure 4:
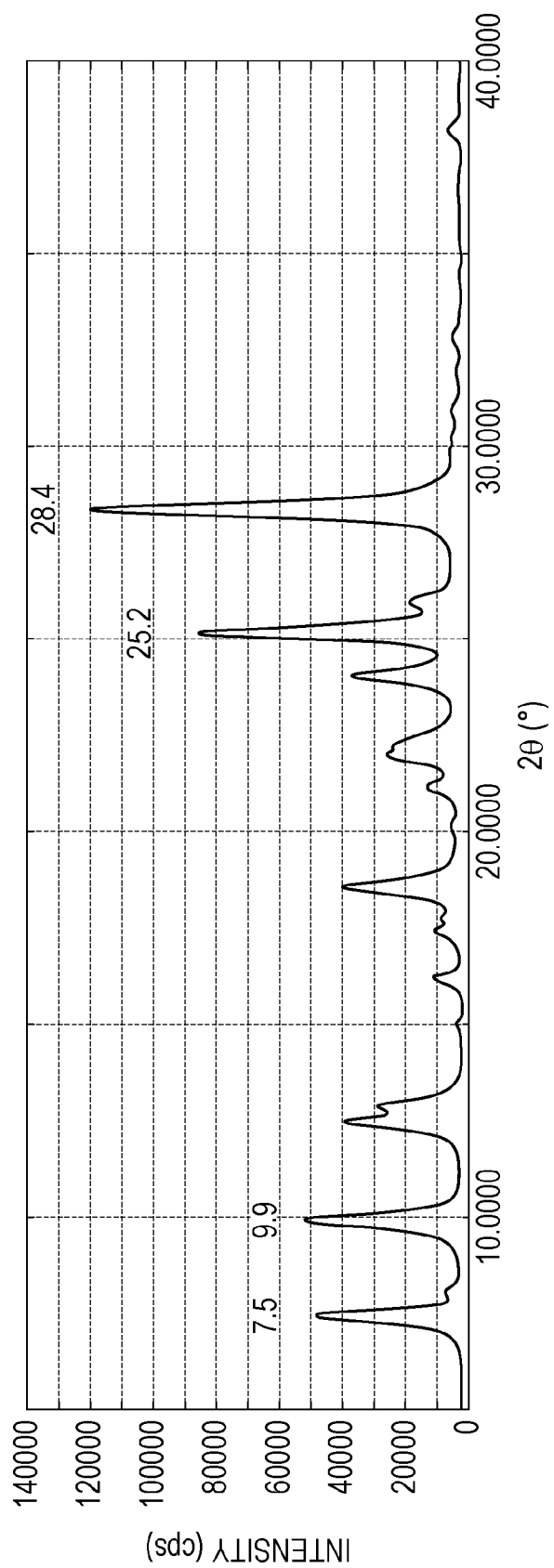
FIG. 4 is a powder X-ray diffraction pattern of a hydroxygallium phthalocyanine crystal obtained in Example 1-3.

In substantially the same manner as that described in Example 1-1 except that 0.5 parts of 1,3-dimethyl-1,3-diphenylurea was used instead of 0.001 parts of the phenolic compound represented by Formula (1), 0.43 parts of a hydroxygallium phthalocyanine crystal was obtained. The obtained hydroxygallium phthalocyanine crystal had a powder X-ray diffraction pattern shown in FIG. 4. The hydroxygallium phthalocyanine crystal had peaks at Bragg angles 2θ±0.2° of 7.5°, 9.9°, 25.2°, and 28.3° as determined by X-ray diffraction with Cu Kα radiation. The intensity of the peak at a Bragg angle 2θ±0.2° of 9.9° was 1.07 when the intensity of the peak at a Bragg angle 2θ±0.2° of 7.5° was 1 as determined by X-ray diffraction with Cu Kα radiation.

It was confirmed by NMR measurement that the hydroxygallium phthalocyanine crystal obtained in Example 1-3 contained 0.12% by mass of 1,3-dimethyl-1,3-diphenylurea and 0.68% by mass of N-methylformamide as converted from the proton ratio. Since 1,3-dimethyl-1,3-diphenylurea is soluble in N-methylformamide, it is understandable that 1,3-dimethyl-1,3-diphenylurea is contained in the hydroxygallium phthalocyanine crystal.

Example 1-4

Figure 5:
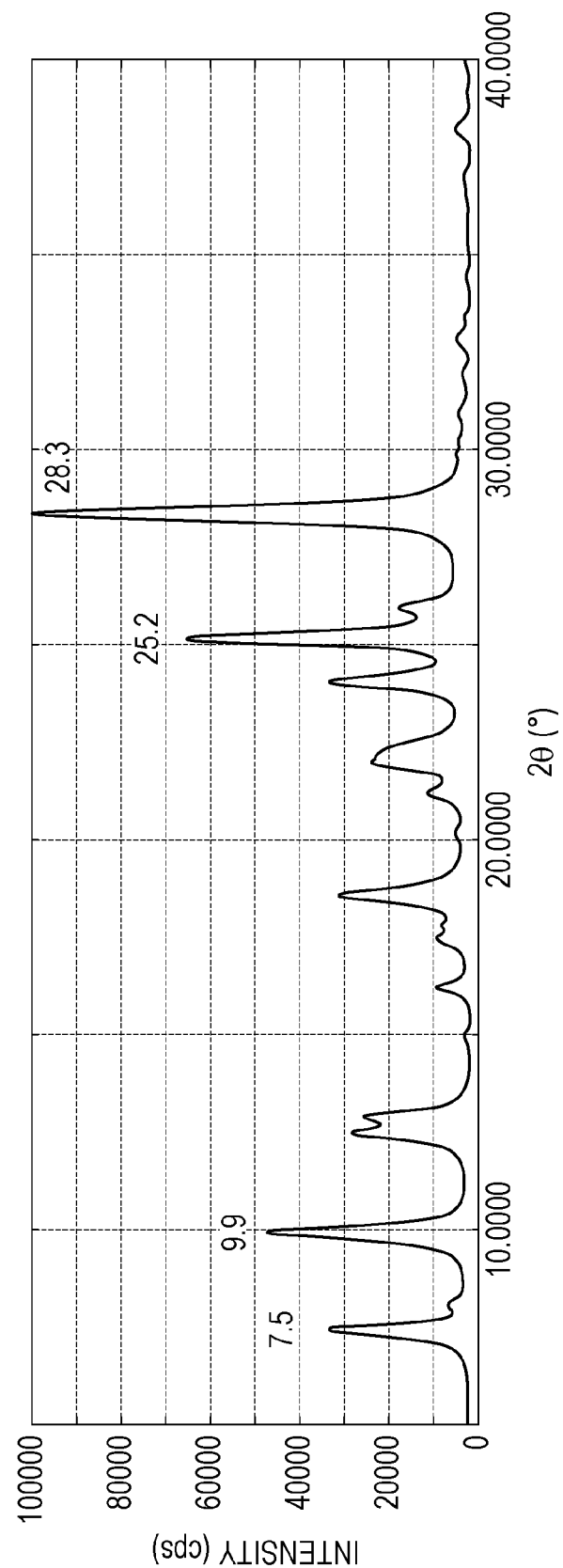
FIG. 5 is a powder X-ray diffraction pattern of a hydroxygallium phthalocyanine crystal obtained in Example 1-4.

In substantially the same manner as that described in Example 1-3 except that the milling time was varied from 470 hours to 1,000 hours, 0.45 parts of a hydroxygallium phthalocyanine crystal was obtained. The obtained hydroxygallium phthalocyanine crystal had a powder X-ray diffraction pattern shown in FIG. 5. The hydroxygallium phthalocyanine crystal had peaks at Bragg angles 2θ±0.2° of 7.5°, 9.9°, 25.2°, and 28.3° as determined by X-ray diffraction with Cu Kα radiation. The intensity of the peak at a Bragg angle 2θ±0.2° of 9.9° was 1.45 when the intensity of the peak at a Bragg angle 2θ±0.2° of 7.5° was 1 as determined by X-ray diffraction with Cu Kα radiation.

It was confirmed by NMR measurement that the hydroxygallium phthalocyanine crystal contained 0.17% by mass of 1,3-dimethyl-1,3-diphenylurea and 0.84% by mass of N-methylformamide.

Example 1-5

Figure 6:
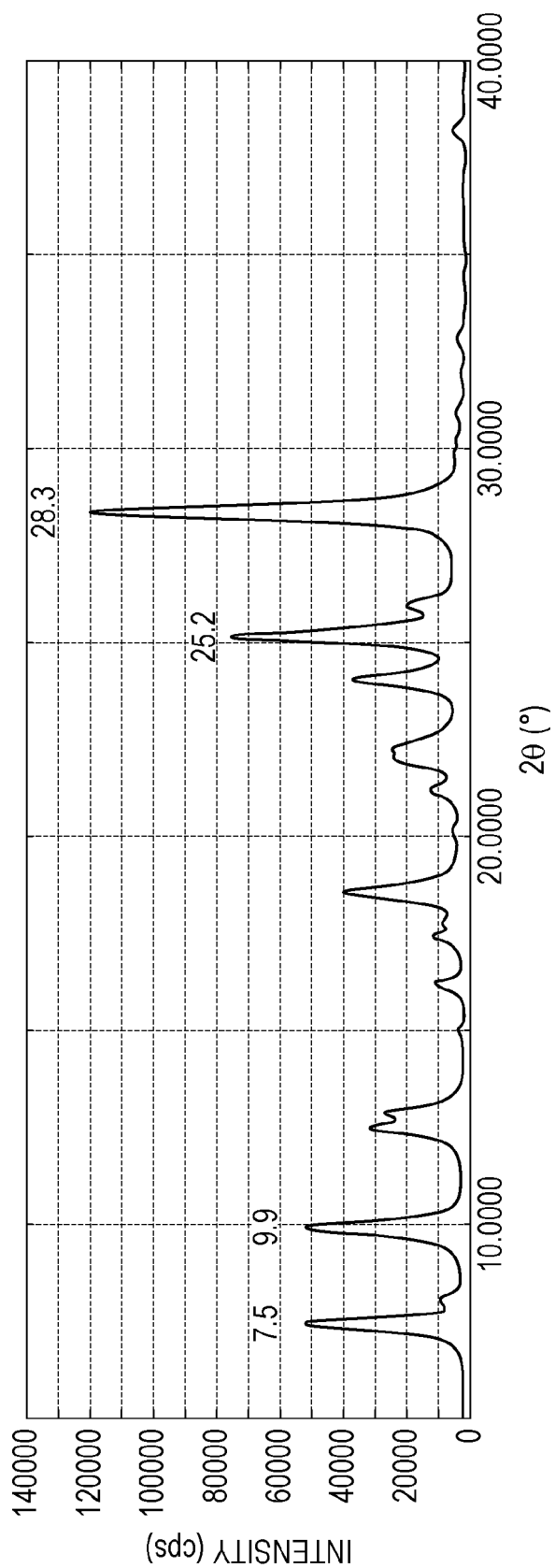
FIG. 6 is a powder X-ray diffraction pattern of a hydroxygallium phthalocyanine crystal obtained in Example 1-5.

In substantially the same manner as that described in Example 1-1 except that 1.0 part of bis(4-(diethylamino)phenyl)methanone was used instead of 0.001 parts of the phenolic compound represented by Formula (1), 0.36 parts of a hydroxygallium phthalocyanine crystal was obtained. The obtained hydroxygallium phthalocyanine crystal had a powder X-ray diffraction pattern shown in FIG. 6. The hydroxygallium phthalocyanine crystal had peaks at Bragg angles 2θ±0.2° of 7.5°, 9.9°, 25.2°, and 28.3° as determined by X-ray diffraction with Cu Kα radiation. The intensity of the peak at a Bragg angle 2θ±0.2° of 9.9° was 1.01 when the intensity of the peak at a Bragg angle 2θ±0.2° of 7.5° was 1 as determined by X-ray diffraction with Cu Kα radiation.

It was confirmed by NMR measurement that the hydroxygallium phthalocyanine crystal obtained in Example 1-5 contained 0.23% by mass of bis(4-(diethylamino)phenyl)methanone and 0.70% by mass of N-methylformamide as converted from the proton ratio. Since bis(4-(diethylamino)phenyl)methanone is soluble in N-methylformamide, it is understandable that bis(4-(diethylamino)phenyl)methanone, as well as N-methylformamide, is contained in the hydroxygallium phthalocyanine crystal.

Example 1-6

Figure 7:
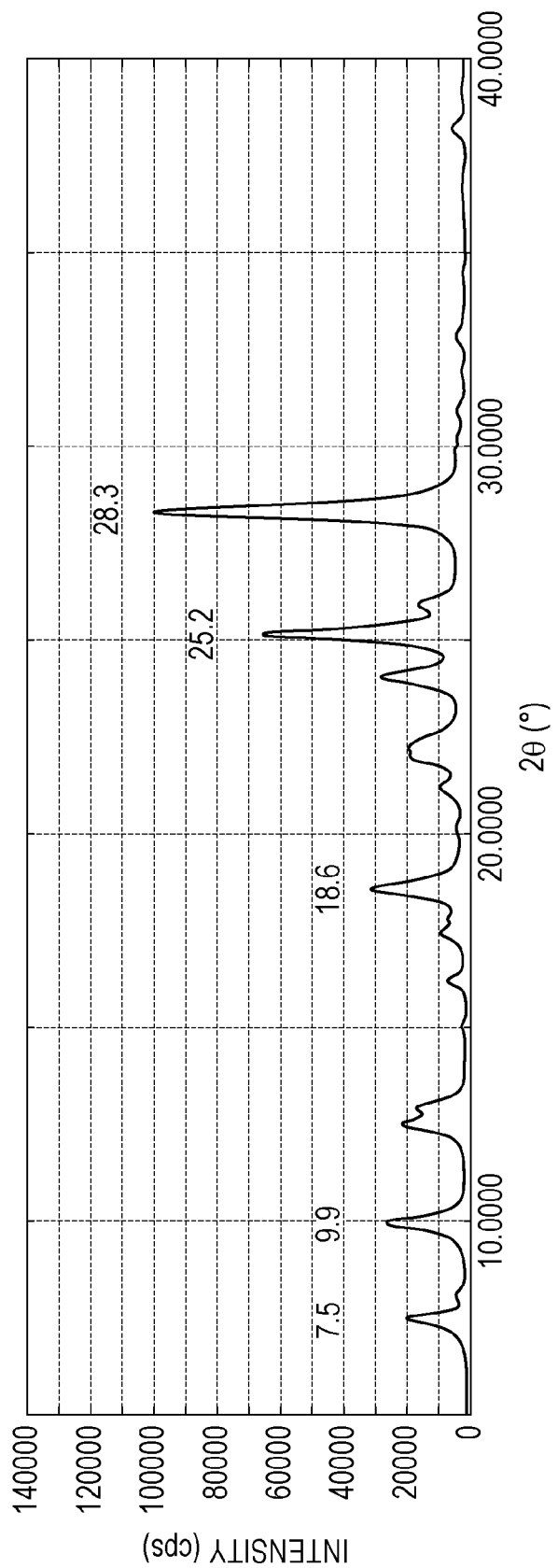
FIG. 7 is a powder X-ray diffraction pattern of a hydroxygallium phthalocyanine crystal obtained in Example 1-6.

In substantially the same manner as that described in Example 1-5 except that the milling time was varied from 470 hours to 1,000 hours, 0.47 parts of a hydroxygallium phthalocyanine crystal was obtained. The obtained hydroxygallium phthalocyanine crystal had a powder X-ray diffraction pattern shown in FIG. 7. The hydroxygallium phthalocyanine crystal had peaks at Bragg angles 2θ±0.2° of 7.5°, 9.9°, 25.2°, and 28.3° as determined by X-ray diffraction with Cu Kα radiation. The intensity of the peak at a Bragg angle 2θ±0.2° of 9.9° was 1.35 when the intensity of the peak at a Bragg angle 2θ±0.2° of 7.5° was 1 as determined by X-ray diffraction with Cu Kα radiation.

It was confirmed by NMR measurement that the hydroxygallium phthalocyanine crystal contained 2.32% by mass of bis(4-(diethylamino)phenyl)methanone and 0.82% by mass of N-methylformamide.

Comparative Example 1-1

Figure 8:
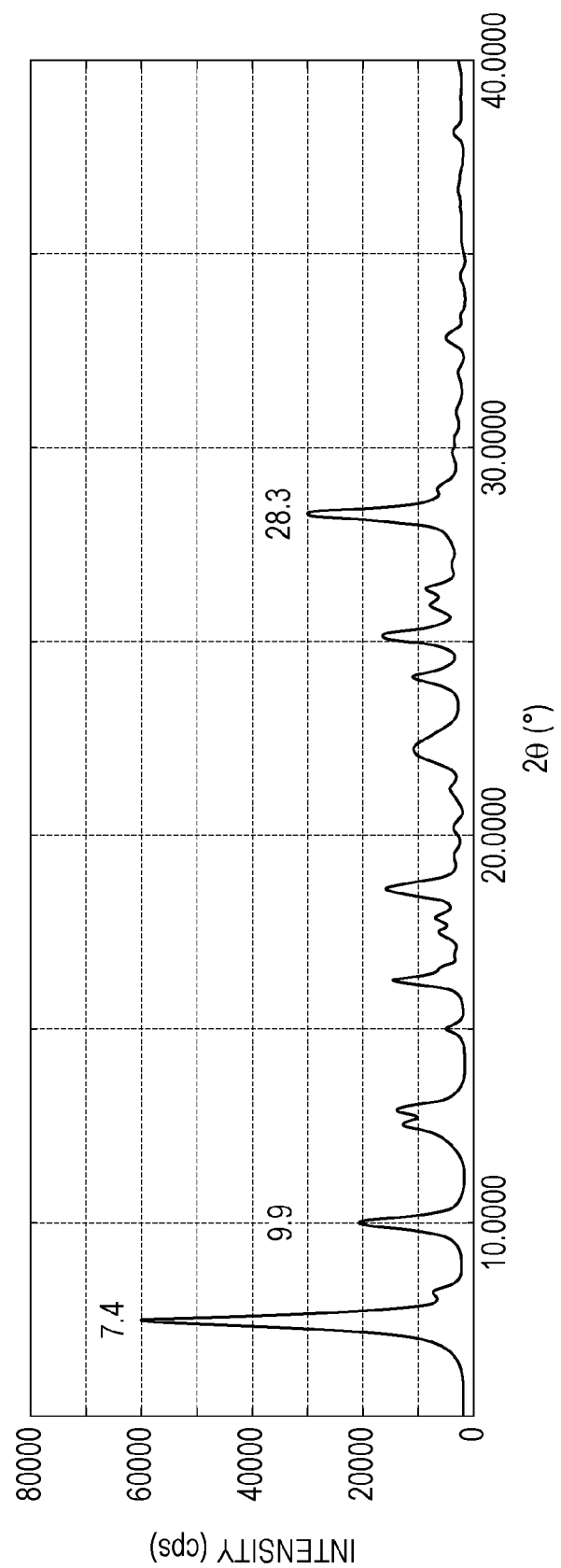
FIG. 8 is a powder X-ray diffraction pattern of a hydroxygallium phthalocyanine crystal obtained in Comparative Example 1-1.

In a ball mill, 0.5 parts of hydroxygallium phthalocyanine identical to one used in Example 1-1 and 10 parts of N,N-dimethylformamide were milled at room temperature (23° C.) for 30 hours using 20 parts of glass beads with a diameter of 0.8 mm. A hydroxygallium phthalocyanine crystal was taken out of the dispersion using N,N-dimethylformamide and was filtered. A filter was washed with N,N-dimethylformamide and was then sufficiently washed with tetrahydrofuran. A filter cake was vacuum-dried, whereby 0.45 parts of the hydroxygallium phthalocyanine crystal was obtained. The obtained hydroxygallium phthalocyanine crystal had a powder X-ray diffraction pattern shown in FIG. 8. The hydroxygallium phthalocyanine crystal had peaks at Bragg angles 2θ±0.2° of 7.5°, 9.9°, 25.2°, and 28.3° as determined by X-ray diffraction with Cu Kα radiation. The intensity of the peak at a Bragg angle 2θ±0.2° of 9.9° was 0.33 when the intensity of the peak at a Bragg angle 2θ±0.2° of 7.5° was 1 as determined by X-ray diffraction with Cu Kα radiation.

Comparative Example 1-2

Figure 9:
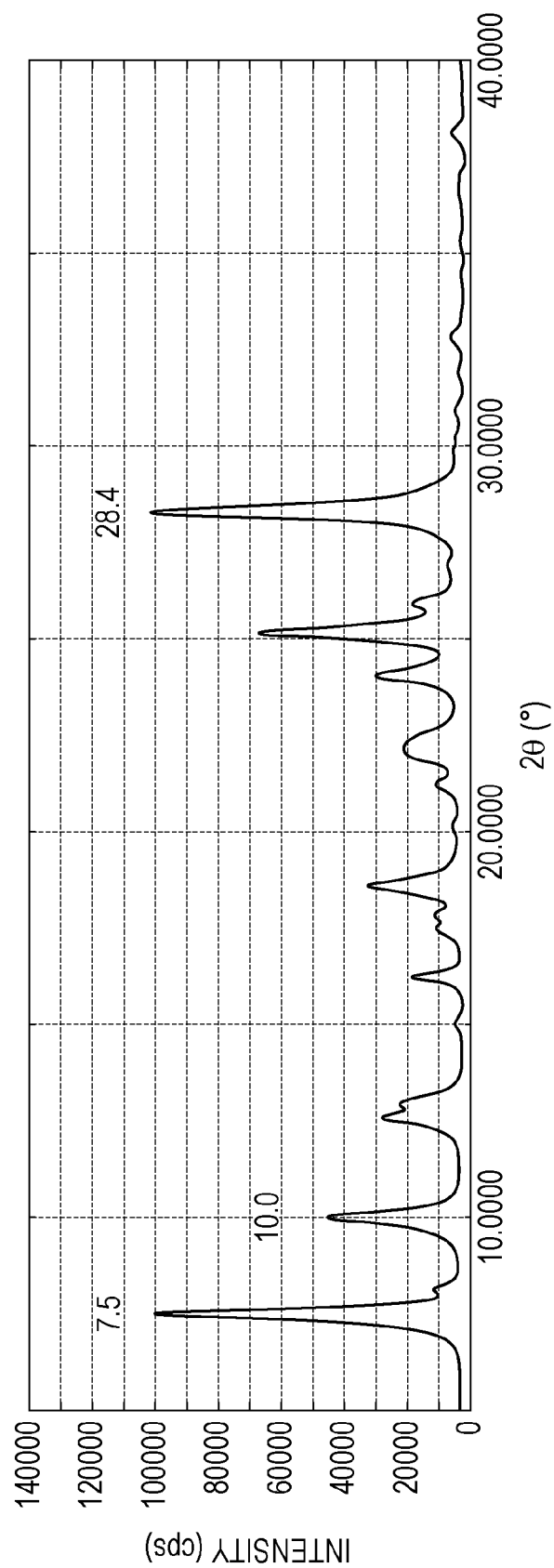
FIG. 9 is a powder X-ray diffraction pattern of a hydroxygallium phthalocyanine crystal obtained in Comparative Example 1-2.

In substantially the same manner as that described in Example 1-1 except that 0.001 parts of the phenolic compound represented by Formula (1) was not used, 0.44 parts of a hydroxygallium phthalocyanine crystal was obtained. The obtained hydroxygallium phthalocyanine crystal had a powder X-ray diffraction pattern shown in FIG. 9. The hydroxygallium phthalocyanine crystal had peaks at Bragg angles 2θ±0.2° of 7.5°, 9.9°, and 28.3° as determined by X-ray diffraction with Cu Kα radiation. The intensity of the peak at a Bragg angle 2θ±0.2° of 9.9° was 0.45 when the intensity of the peak at a Bragg angle 2θ±0.2° of 7.5° was 1 as determined by X-ray diffraction with Cu Kα radiation.

Comparative Example 1-3

Figure 10:
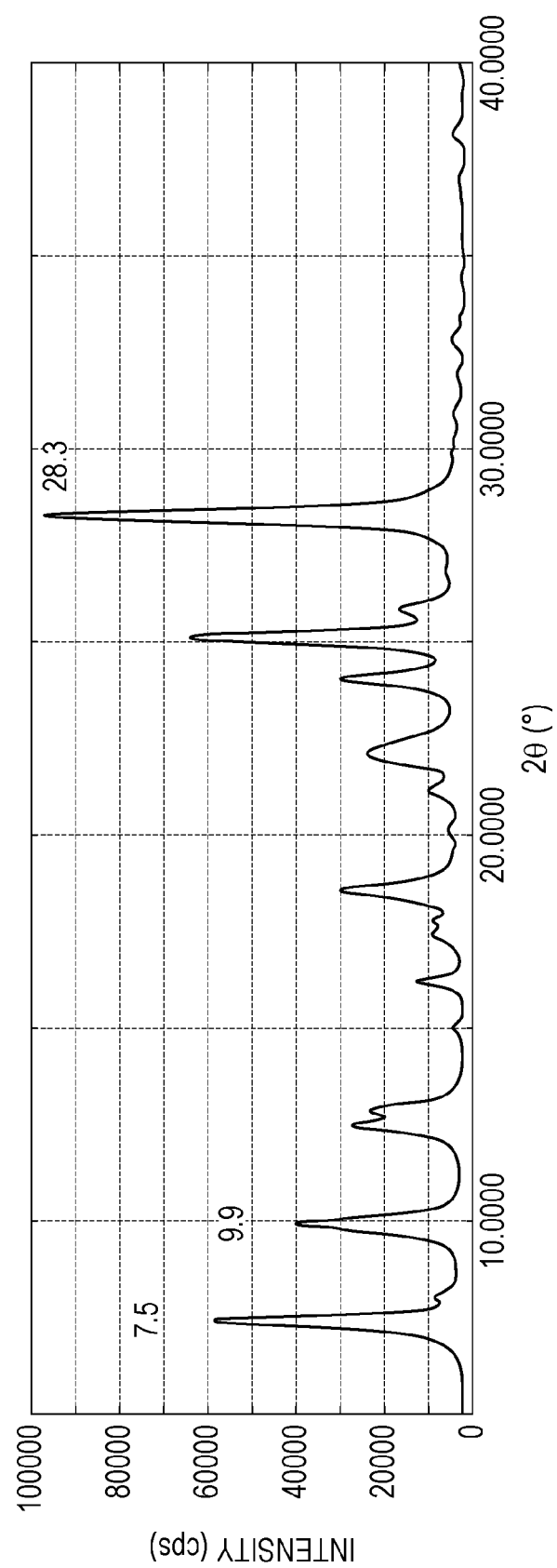
FIG. 10 is a powder X-ray diffraction pattern of a hydroxygallium phthalocyanine crystal obtained in Comparative Example 1-3.

In substantially the same manner as that described in Example 1-1 except that the milling time was varied from 470 hours to 94 hours, 0.40 parts of a hydroxygallium phthalocyanine crystal was obtained. The obtained hydroxygallium phthalocyanine crystal had a powder X-ray diffraction pattern shown in FIG. 10. The hydroxygallium phthalocyanine crystal had peaks at Bragg angles 2θ±0.2° of 7.5°, 9.9°, and 28.3° as determined by X-ray diffraction with Cu Kα radiation. The intensity of the peak at a Bragg angle 2θ±0.2° of 9.9° was 0.70 when the intensity of the peak at a Bragg angle 2θ±0.2° of 7.5° was 1 as determined by X-ray diffraction with Cu Kα radiation.

Example 2-1

A conductive layer coating fluid was prepared in such a manner that 60 parts of tin oxide-coated barium sulfate particles, Passtran™ PC1, available from Mitsui Mining & Smelting Co., Ltd.; 15 parts of titanium dioxide particles, TITANIX™ JR, available from TAYCA Corporation; 43 parts of a resol-type phenol resin, PHENOLITE™ J-325, available from DIC Corporation, the resol-type phenol resin having a solid content of 70% by mass; 0.015 parts of silicone oil, SH28PA, available from Toray Silicone Co., Ltd.; and 3.6 parts of a silicone resin, Tospearl™ 120, available from Toshiba Silicone Co., Ltd. were dispersed in a mixture of 50 parts of 2-methoxy-1-propanol and 50 parts of methanol for 20 hours using a ball mill.

The conductive layer coating fluid was applied to an aluminium cylinder, used as a support, having a diameter of 24 mm by dipping and a wet coating thereby obtained was dried at 140° C. for 30 minutes, whereby a conductive layer with a thickness of 15 μm was formed.

Next, an undercoat layer coating fluid was prepared in such a manner that 10 parts of a copolymer nylon resin, AMILAN™ CM8000, available from Toray Industries Inc. and 30 parts of a methoxymethylated nylon 6 resin, Toresin™ EF-30T, available from Teikoku Kagaku Sangyo K.K. were dissolved in a solvent mixture of 400 parts of methanol and 200 parts of n-butanol.

The undercoat layer coating fluid was applied to the conductive layer by dipping and a wet coating thereby obtained was dried, whereby an undercoat layer with a thickness of 0.5 μm was formed.

Next, a dispersion was prepared in such a manner that 10 parts of the hydroxygallium phthalocyanine crystal (charge generation material) obtained in Example 1-1 and 5 parts of polyvinyl butyral, S-LEC™ BX-1, available from Sekisui Chemical Co., Ltd. were dispersed in 250 parts of cyclohexanone for 4 hours using a sand mill containing glass beads with a diameter of 1 mm. The dispersion was diluted with 250 parts of ethyl acetate, whereby a charge generation layer coating fluid was prepared.

The charge generation layer coating fluid was applied to the undercoat layer by dipping and a wet coating thereby obtained was dried at 100° C. for 10 minutes, whereby a charge generation layer with a thickness of 0.16 μm was formed.

Next, a charge transport layer coating fluid was prepared in such a manner that 8 parts of a compound (charge transport material) represented by Formula (2) below and 10 parts of polycarbonate, Iupilon™ Z-200, available from Mitsubishi Gas Chemical Company, Inc. were dissolved in 70 parts of monochlorobenzene.

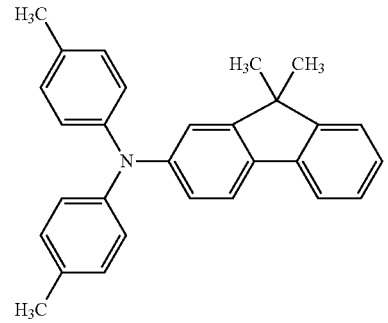

(2)

The charge transport layer coating fluid was applied to the charge generation layer by dipping and a wet coating thereby obtained was dried at 110° C. for 1 hour, whereby a charge transport layer with a thickness of 23 μm was formed.

In this way, a cylindrical (drum-shaped) electrophotographic photosensitive member of Example 2-1 was prepared.

Example 2-2

An electrophotographic photosensitive member of Example 2-2 was prepared in substantially the same manner as that described in Example 2-1 except that the hydroxygallium phthalocyanine crystal obtained in Example 1-2 was used to prepare a charge generation layer coating fluid.

Example 2-3

An electrophotographic photosensitive member of Example 2-3 was prepared in substantially the same manner as that described in Example 2-1 except that the hydroxygallium phthalocyanine crystal obtained in Example 1-3 was used to prepare a charge generation layer coating fluid.

Example 2-4

An electrophotographic photosensitive member of Example 2-4 was prepared in substantially the same manner as that described in Example 2-1 except that the hydroxygallium phthalocyanine crystal obtained in Example 1-4 was used to prepare a charge generation layer coating fluid.

Example 2-5

An electrophotographic photosensitive member of Example 2-5 was prepared in substantially the same manner as that described in Example 2-1 except that the hydroxygallium phthalocyanine crystal obtained in Example 1-5 was used to prepare a charge generation layer coating fluid.

Example 2-6

An electrophotographic photosensitive member of Example 2-6 was prepared in substantially the same manner as that described in Example 2-1 except that the hydroxygallium phthalocyanine crystal obtained in Example 1-6 was used to prepare a charge generation layer coating fluid.

Comparative Example 2-1

An electrophotographic photosensitive member of Comparative Example 2-1 was prepared in substantially the same manner as that described in Example 2-1 except that the hydroxygallium phthalocyanine crystal obtained in Comparative Example 1-1 was used to prepare a charge generation layer coating fluid.

Comparative Example 2-2

An electrophotographic photosensitive member of Comparative Example 2-2 was prepared in substantially the same manner as that described in Example 2-1 except that the hydroxygallium phthalocyanine crystal obtained in Comparative Example 1-2 was used to prepare a charge generation layer coating fluid.

Comparative Example 2-3

An electrophotographic photosensitive member of Comparative Example 2-3 was prepared in substantially the same manner as that described in Example 2-1 except that the hydroxygallium phthalocyanine crystal obtained in Comparative Example 1-3 was used to prepare a charge generation layer coating fluid.

Evaluation of Examples 2-1 to 2-6 and Comparative Examples 2-1 to 2-3

The electrophotographic photosensitive members of Examples 2-1 to 2-6 and Comparative Examples 2-1 to 2-3 were evaluated for a ghost image.

An electrophotographic apparatus used for evaluation was a laser beam printer, Color Laser Jet™ CP3525dn, available from Hewlett-Packard Japan, Ltd. The laser beam printer was modified as described below. That is, the laser beam printer was modified such that pre-exposure was not performed and charge conditions and image exposure were variable. Each of the prepared electrophotographic photosensitive members was attached to a cyan process cartridge. The cyan process cartridge was attached to a station such that the laser beam printer was operable even if another color process cartridge was not attached to the laser beam printer.

Upon outputting an image, the cyan process cartridge only was attached to the laser beam printer and a monochrome image was output using a cyan toner only.

Charge conditions and exposure were adjusted such that the initial dark potential was −500 V and the initial light potential was −100 V in a normal-temperature, normal-humidity environment having a temperature of 23° C. and a relative humidity of 55%. Upon setting the potentials, the surface potential of each electrophotographic photosensitive member was measured in such a manner that a cartridge was modified and a potential probe, Model 6000 B-8, available from TREK Japan KK was attached to a development position. The potential of a central portion of the electrophotographic photosensitive member was measured using a surface potentiometer, Model 344, available from TREK Japan KK.

Thereafter, ghost images were evaluated under the same conditions. In particular, 1,000 sheets were subjected to a repetitive sheet feed test and the ghost images were evaluated directly after the repetitive sheet feed test and after 15 hours from the repetitive sheet feed test. Evaluation results obtained in the normal-temperature, normal-humidity environment are shown in the table.

Next, the electrophotographic photosensitive members were left for 3 days in a low-temperature, low-humidity environment having a temperature of 15° C. and a relative humidity of 10% together with the electrophotographic apparatus for evaluation, followed by evaluating the ghost images. Under the same conditions, 1,000 sheets were subjected to the repetitive sheet feed test. The ghost images were evaluated directly after the repetitive sheet feed test and after 15 hours from the repetitive sheet feed test. Evaluation results obtained in the low-temperature, low-humidity environment are shown in the table.

Incidentally, the repetitive sheet feed test was performed in such a manner that an E-text image was printed on A4 sheets of plain paper at a coverage rate of 1% using a cyan color only.

A method of evaluating the ghost images was as described below.

In the evaluation of the ghost images, a blank image was printed on a sheet, followed by printing each of four types of ghost charts on a corresponding one of four sheets. Next, after a solid black image was printed on a sheet, each of four types of ghost charts was printed on a corresponding one of four sheets again. Images were printed in that order and eight ghost images were evaluated. Each ghost chart was prepared in such a manner that a range of 30 mm from a print image-starting position (10 mm from the upper end of a sheet) was set to a blank background, four solid black squares with a side length of 25 mm were arranged at equal intervals in parallel, and four types of half-tone print patterns were printed 30 mm or more apart from the print image-starting position. Ranking was performed on the basis of the four types of ghost charts.

The four types of ghost charts are those having different half-tone patterns 30 mm or more apart from the print image-starting position. The half-tone patterns are categorized into four types below.

(1) A lateral* one-dot, one-space print (laser exposure) pattern.

(2) A lateral* two-dot, two space print (laser exposure) pattern.

(3) A lateral* two-dot, three space print (laser exposure) pattern.

(4) A print (laser exposure) pattern like a "Keima" pattern (a pattern in which dots are printed in two of six squares like the movement of Keima (Knight) in Shogi (Japanese chess)).

*: The term "lateral" refers to the scanning direction of a laser beam applied to the surface of each electrophotographic photosensitive member (a direction perpendicular to the print direction of a sheet printed using the laser beam printer).

The ghost images were ranked as described below. Incidentally, Ranks 4, 5, and 6 were judged to be levels where an effect of the present invention was not sufficiently achieved.

Rank 1: No ghost is observed in any ghost chart.

Rank 2: A ghost is slightly observed in a specific ghost chart.

Rank 3: A ghost is slightly observed in every ghost chart.

Rank 4: A ghost is observed in a specific ghost chart.

Rank 5: A ghost is observed in every ghost chart.

Rank 6: A ghost is clearly observed in a specific ghost chart.

TABLE

|  | Normal-temperature, normal-humidity environment | | | Low-temperature, low-humidity environment | | |
|---|---|---|---|---|---|---|
|  | Initial Rank of ghost | Directly after repetitive sheet feed test Rank of ghost | After 15 hours from repetitive sheet feed test Rank of ghost | Initial Rank of ghost | Directly after repetitive sheet feed test Rank of ghost | After 15 hours from repetitive sheet feed test Rank of ghost |
| Example 2-1 | 1 | 1 | 1 | 1 | 2 | 2 |
| Example 2-2 | 1 | 1 | 1 | 1 | 2 | 1 |
| Example 2-3 | 1 | 1 | 1 | 1 | 2 | 1 |
| Example 2-4 | 1 | 1 | 1 | 1 | 1 | 1 |
| Example 2-5 | 1 | 2 | 2 | 2 | 3 | 2 |
| Example 2-6 | 1 | 1 | 1 | 1 | 2 | 1 |
| Comparative Example 2-1 | 4 | 5 | 4 | 5 | 6 | 5 |
| Comparative Example 2-2 | 2 | 3 | 3 | 3 | 4 | 4 |
| Comparative Example 2-3 | 2 | 3 | 2 | 2 | 3 | 3 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-122712, filed Jun. 13, 2014, which is hereby incorporated by reference herein in its entirety.

What is claimed is:

1. A hydroxygallium phthalocyanine crystal having peaks at Bragg angles 2θ±0.2° of 7.5°, 9.9°, 25.2°, and 28.3° as determined by X-ray diffraction with Cu Kα radiation, wherein the intensity of the peak at a Bragg angle 2θ±0.2° of 9.9° is higher than the intensity of the peak at a Bragg angle 2θ±0.2° of 7.5°.

2. The hydroxygallium phthalocyanine crystal according to claim 1, wherein the intensity of the peak at a Bragg angle 2θ±0.2° of 9.9° is 1.1 to 2.0 when the intensity of the peak at a Bragg angle 2θ±0.2° of 7.5° is 1.

3. The hydroxygallium phthalocyanine crystal according to claim 1, wherein the hydroxygallium phthalocyanine crystal is a hydroxygallium phthalocyanine crystal in which an amide compound is contained.

4. The hydroxygallium phthalocyanine crystal according to claim 3, wherein the content of the amide compound is 0.1% by mass or more and 3% by mass or less based on a hydroxygallium phthalocyanine in the hydroxygallium phthalocyanine crystal.

5. The hydroxygallium phthalocyanine crystal according to claim 3, wherein the amide compound is N-methylformamide.

6. The hydroxygallium phthalocyanine crystal according to claim 1, wherein the hydroxygallium phthalocyanine crystal is a hydroxygallium phthalocyanine crystal in which a phenolic compound, an amine compound, or a carbonyl compound is contained.

7. An electrophotographic photosensitive member comprising:
a support; and
a photosensitive layer on the support,
wherein the photosensitive layer contains the hydroxygallium phthalocyanine crystal according to claim 1.

8. The electrophotographic photosensitive member according to claim 7, wherein the photosensitive layer is a multilayer photosensitive layer comprising a charge generation layer and a charge transport layer on the charge generation layer and the charge generation layer contains the hydroxygallium phthalocyanine crystal.

9. A process cartridge detachable from a main body of an electrophotographic apparatus, wherein the process cartridge integrally supports:
the electrophotographic photosensitive member according to claim 7; and
at least one device selected from the group consisting of a charging device, a developing device, and a cleaning device.

10. An electrophotographic apparatus comprising:
the electrophotographic photosensitive member according to claim 7;
a charging device;
an exposure device;
a developing device; and
a transfer device.

* * * * *